S. S. McINTYRE.
WINDING ENGINE.
APPLICATION FILED OCT. 30, 1920.
1,381,209.
Patented June 14, 1921.
3 SHEETS—SHEET 3.
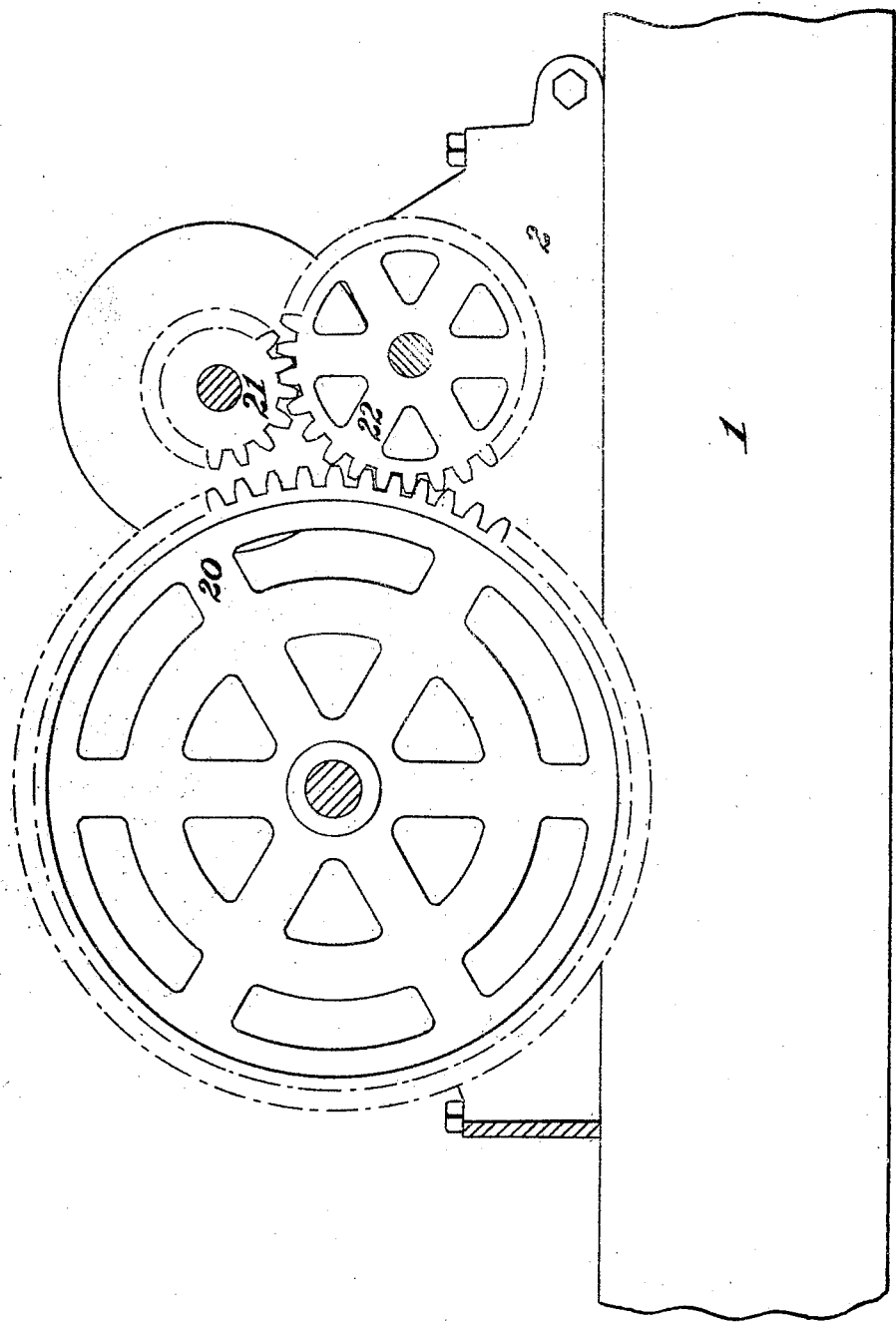
INVENTOR
Sydney S. McIntyre
BY
H. L. & C. L. Reynolds
ATTORNEYS

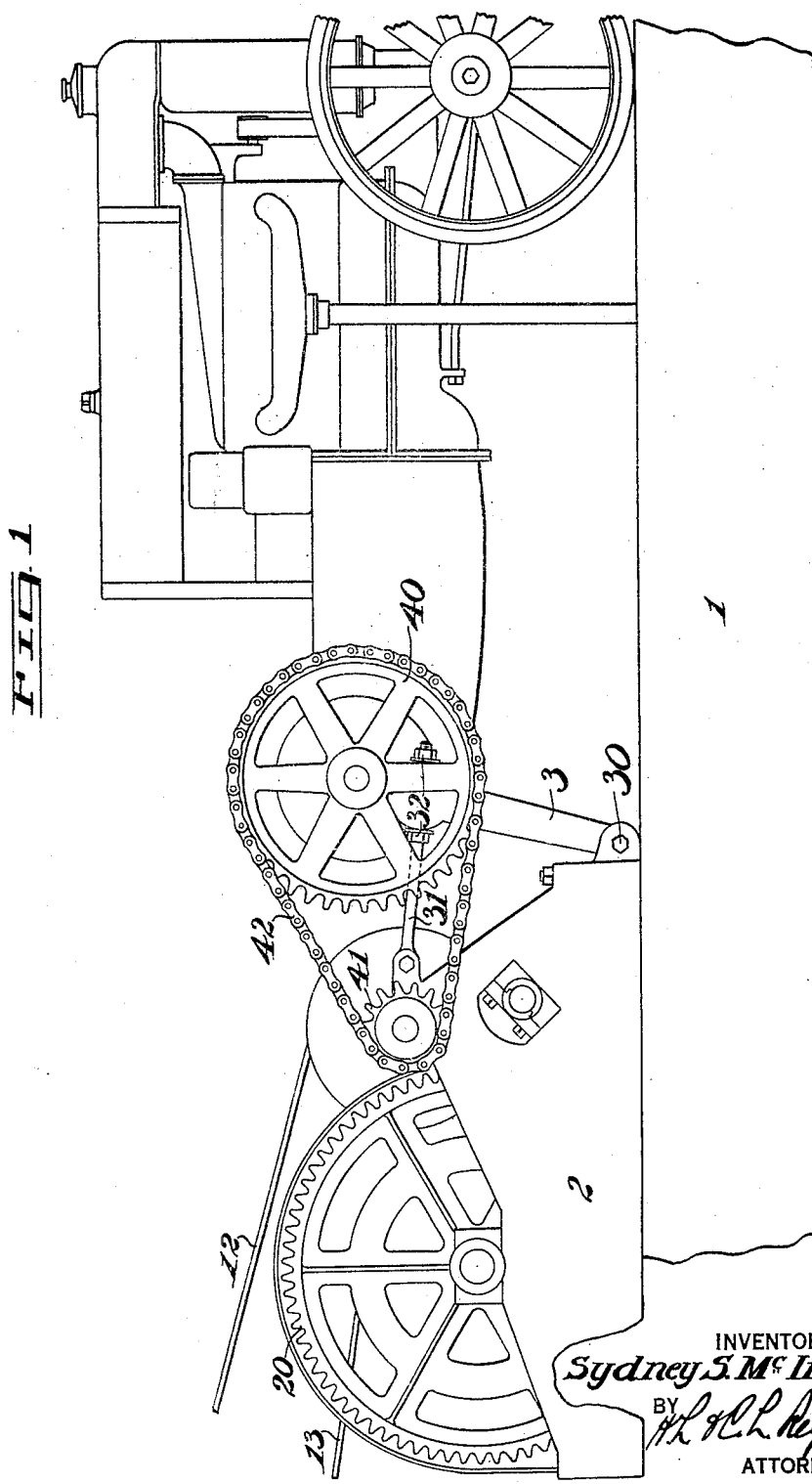

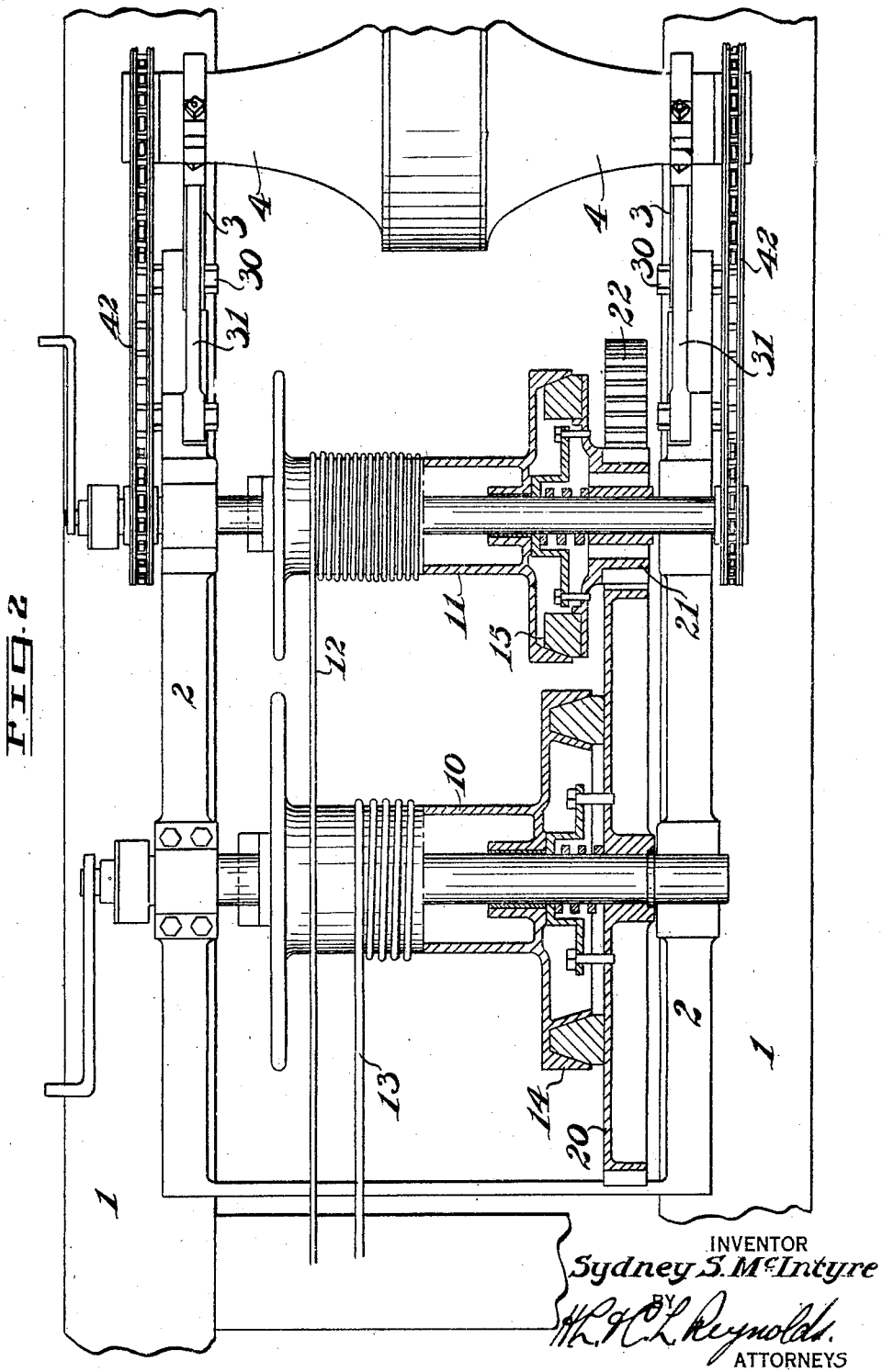

UNITED STATES PATENT OFFICE.

SYDNEY S. McINTYRE, OF SEDRO WOOLLEY, WASHINGTON.

WINDING-ENGINE.

1,381,209. Specification of Letters Patent. Patented June 14, 1921.

Application filed October 30, 1920. Serial No. 420,690.

*To all whom it may concern:*

Be it known that I, SYDNEY S. MCINTYRE, a citizen of the United States of America, and resident of the city of Sedro Woolley, Skagit county, State of Washington, have invented certain new and useful Improvements in Winding-Engines, of which the following is a specification.

My invention relates to winding engines and consists in a winding engine proper having winding drums and shafts and the means for connecting them for rotation and also having means whereby the same may be combined with a tractor as a source of power for operating the winding engine.

The object of my invention is to provide the drum mechanism as a separate unit which is provided with means whereby it may be connected with a tractor so as to be operated by the tractor.

The features of my invention which I believe to be novel and for which I desire to secure a patent will first be described and then particularly pointed out in the claims.

In the accompanying drawings I have shown a preferred embodiment of my invention and the manner of combining it with a tractor.

Figure 1 shows a side view of the winding engine and the major part of a tractor, illustrating the manner of connecting the two for operation.

Fig. 2 is a plan view showing one end of the drums in section.

Fig. 3 is a side view taken on a plane just inside the frame of the winding drums.

The winding engine herein illustrated has been designed chiefly for use as an engine for hauling logs, pulling stumps, and other like work, and the design has been made such that it may be easily combined with a tractor as a source of power, thus making it possible to use for this purpose an ordinary tractor which at other times would be used as a mobile tractor.

To secure this result and the ability to combine and disconnect the two essential parts, namely, the drum mechanism and the power mechanism, I have mounted the drums upon a frame which is independent of the tractor and have provided such frame with means whereby the driving axle end of the tractor may be supported from this frame, and with means whereby the driving axle of the tractor may be connected at each end with a shaft of the drum mechanism. The two parts, namely, the drum mechanism and the tractor mechanism, are both mounted upon a sled or other suitable subframe which in the drawings is represented by the beams 1. These are designed to be used as a sled so that the tractor may be drawn over the ground from place to place as may be necessary in its use.

The frame 2, in which the drums are mounted, may be of any suitable construction which is found to be adapted for this purpose. In the machine as illustrated, I have shown two drums 10 and 11 which are journaled in the frame 2. The drum 10 is designed to be the pulling drum or the one which is employed in making heavy pulls. The other drum 11 is designed for handling the haul back rope 12. This haul back rope is designed to be extended to a distant pulley located beyond the point where the stumps are being pulled, so that the main or pull rope may be carried out away from the engine.

Each of these drums is provided with a friction driving means, as 14 and 15, which may be of any suitable or desired construction. In the device as illustrated in the drawings, the two drums 10 and 11 are supposed to be mounted so as to turn loosely upon the shaft. Secured to the shafts so as to turn therewith are gears 20 and 21. These gears do not intermesh, but are separated sufficiently to clear, as is illustrated in Fig. 3. They are connected so as to be driven together by means of an intermediate or idler gear 22. The necessity or desirability of this intermediate gear is merely to secure rotation of both drums in the same direction. The intermediate gear might be dispensed with if it were not objectionable to turn both drums in opposite directions.

Securely pivoted to the rear end of the frame 2 which carries the drum, and at each side thereof, is a strut or supporting post 3. These posts are pivoted at the point 30. The upper ends of these posts are made of such shape that they may engage and support the rear axle housing 4 of a tractor. To regulate the horizontal position of the upper ends of these struts or supporting posts with relation to the shafts of the drums, I connect their upper ends with the frame 2 by means of the thrust rods 31 which are provided with threaded ends upon which are mounted nuts, as 32, so that the position of the struts 3 may be adjusted in order to maintain the chain which connects the tractor with the winding engine, in proper tightness.

The ordinary traction wheels of the tractor are removed when the tractor is put in place. In the place of these tractor wheels, I mount sprocket wheels, as 40, and upon the shaft of the drum 11 I mount sprocket wheels 41 at each end thereof. The two sprocket wheels 40 and 41, at each side of the machine, are connected by sprocket chains 42.

By the above expedient it is not necessary to change any part of the tractor. The only change made is to substitute the sprocket wheel for the ordinary traction wheel and this may be done without in any way altering the parts of the tractor. When the use of the tractor for this purpose is ended, it may have its tractor wheels again secured in place and it is then ready for ordinary use as a tractor. It is possible to secure variation in speed of operation of the drums by the ordinary speed changing device of the tractor. It is evident that the equivalents of the sprocket wheels and chain which are ordinarily recognized in mechanics may be substituted for the sprocket wheel and chain, but I now prefer to employ such connecting means as being simpler than the others.

The power of the tractor is first communicated to the shaft of the haul back drum of the winding engine and from this through the intermediate or idler gear to the shaft of the pulling drum 10. The ratio of gears is such that the haul back drum is rotated much faster than the pulling drum 10, so that the pulling cable may be returned at a much greater speed than is employed in hauling in on the load.

What I claim as my invention is:

1. A winding engine comprising a drum and its shaft, a second shaft, a power drive connecting the drum and said second shaft, a frame in which the aforesaid parts are journaled, tractor axle supporting members secured to one end of said frame and adapted to be adjusted toward and from the said second shaft, positive adjusting means connecting said axle-supporting members with the frame, and a power drive mechanism connecting each end of the tractor axle and the said second shaft.

2. A winding engine comprising a drum and its shaft, a second shaft, a power drive connecting the drum and said second shaft, a frame in which the aforesaid parts are journaled, a strut pivoted at each side of that end of the frame adjacent to the second shaft and adapted to receive and support the axle housing of a tractor, a tractor having the housing of its driving axle supported upon said struts, sprocket wheels secured upon said tractor axles in substitution of the tractor driving wheels, a complemental gear on each end of the second shaft and chains connecting said gears of the axle and shaft.

3. A winding engine comprising a drum shaft, a drum and friction driving mechanism therefor mounted upon said shaft, a frame in which said shaft is journaled, upwardly extending arms pivoted to each side of one end of the frame and at their upper ends adapted to supportingly engage the drive axle end of a tractor, adjustable thrust bars connecting said arms with the frame, and driving means adapted to operatively connect the drum shaft with each end of the driving axle of the tractor.

4. A winding engine comprising two drum shafts, a drum and friction driving means therefor mounted on each drum shaft, a frame in which said shafts are journaled, a driving gear secured to each drum shaft, an intermediate gear connecting said other gears, a sprocket wheel upon each end of one drum shaft, complemental sprocket wheels adapted to be secured to the drive axle of a tractor, chains connecting said sprocket wheels, and arms carried by the said frame and adapted to support the driving end of a tractor, and means for adjusting said arms to maintain a proper tension upon the said drive chains.

5. A winding engine comprising a frame, an inhaul drum, an outhaul drum, a shaft for each of said drums journaled in said frame upon which shafts the drums are loosely mounted, the outhaul drum being located above and back of the inhaul drum, friction devices through which each drum may be connected to turn with its shaft, a gear upon each drum shaft, an idler gear connecting said other gears, tractor axle supporting means carried by said frame and adjustable toward and from one of said shafts and means for operatively connecting said shaft with the driving axles of a tractor when carried by said supporting means.

6. A winding engine comprising a frame, an inhaul drum, an outhaul drum, a shaft for each of said drums journaled in said frame upon which shafts the drums are loosely mounted, the outhaul drum being located above and back of the inhaul drum, friction devices through which each drum may be connected to turn with its shaft, driving means connecting said shafts to turn in the same direction, a tractor supporting means carried by said frame, and drum turning means comprising gears secured to the ends of one of the drum shafts and complemental gears secured to the tractor driving axles in substitution for the tractor drive wheels.

Signed at Sedro Woolley, Skagit county, Wash., this 23rd day of October, 1920.

S. S. McINTYRE.